United States Patent [19]

Bansal

[11] Patent Number: 4,973,339
[45] Date of Patent: Nov. 27, 1990

[54] PRESSURE SWING ABSORPTION PROCESS AND SYSTEM FOR GAS SEPARATION

[75] Inventor: Ravinder K. Bansal, East Amherst, N.Y.

[73] Assignee: AirSep Corporation, Buffalo, N.Y.

[21] Appl. No.: 423,805

[22] Filed: Oct. 18, 1989

[51] Int. Cl.$^5$ .............................................. B01D 53/04
[52] U.S. Cl. ............................ 055/031; 55/33; 55/62; 55/68; 55/75; 55/162; 55/179; 55/389
[58] Field of Search ................ 55/25, 26, 31, 33, 58, 55/62, 68, 75, 161–163, 179, 389

[56] References Cited

U.S. PATENT DOCUMENTS

| | | | |
|---|---|---|---|
| 2,918,140 | 12/1959 | Brooks | 55/75 X |
| 3,085,379 | 4/1963 | Kiyonaga et al. | 55/23 |
| 3,102,013 | 8/1963 | Skarstrom | 55/31 |
| 3,150,942 | 9/1964 | Vasan | 55/31 |
| 3,237,379 | 3/1966 | Kant et al. | 55/58 |
| 3,710,547 | 1/1973 | Nelson | 55/58 |
| 3,719,025 | 3/1973 | Heinze et al. | 55/31 |
| 3,923,477 | 12/1975 | Armond et al. | 55/25 |
| 4,011,065 | 3/1977 | Munzner et al. | 55/25 |
| 4,190,424 | 2/1980 | Armond et al. | 55/58 |
| 4,264,340 | 4/1981 | sircar et al. | 55/25 |
| 4,386,945 | 6/1983 | Gardner | 55/26 |
| 4,440,548 | 4/1984 | Hill | 55/26 |
| 4,477,264 | 10/1984 | Kratz et al. | 55/25 |
| 4,552,571 | 11/1985 | Dechene | 55/25 X |
| 4,561,865 | 12/1985 | McCombs et al. | 55/25 |
| 4,572,723 | 2/1986 | Ward | 55/25 |
| 4,661,125 | 4/1987 | Haruna et al. | 55/26 |
| 4,711,645 | 12/1987 | Kumar | 55/33 X |
| 4,744,803 | 5/1988 | Knaebel | 55/25 |
| 4,756,723 | 7/1988 | Sircar | 55/25 |
| 4,813,979 | 3/1989 | Miller et al. | 55/25 |
| 4,880,443 | 11/1989 | Miller et al. | 55/26 |
| 4,892,566 | 1/1990 | Bansal et al. | 55/26 |

FOREIGN PATENT DOCUMENTS 3702190 8/1988 Fed. Rep. of Germany ......... 55/26

Primary Examiner—Robert Spitzer
Attorney, Agent, or Firm—Luedeka, Hodges & Neely

[57] ABSTRACT

A pressure swing adsorption process and system for generating gaseous streams which are high in oxygen purity and high in nitrogen purity utilize a first adsorption zone adapted to principally adsorb oxygen from a feed stream containing oxygen, nitrogen and argon via kinetic separation techniques and a second adsorption zone adapted to adsorb nitrogen from a feed stream containing oxygen and nitrogen via equilibrium separation techniques. Following a step in the process operation involving a directing of a feed stream into the first adsorption zone, the first adsorption zone is purged in a desorption step so that a purge stream exits the inlet of the first adsorption zone. During the initial moments of this desorption step, the purge stream is vented to the atmosphere, and during the latter moments of this desorption step, the gaseous purge stream is conducted to the inlet of the second adsorption zone so that a gaseous stream which is high in oxygen purity exits the outlet of the second adsorption zone. The second adsorption zone is subsequently purged so that a gaseous desorption stream exists the second adsorption zone and is supplied otthe inlet of the first adsorption zone as part of the feed stream.

10 Claims, 5 Drawing Sheets

PRESSURE SWING ABSORPTION PROCESS AND SYSTEM FOR GAS SEPARATION

BACKGROUND OF THE INVENTION

This invention relates generally to the separation of gas mixtures by pressure swing adsorption and relates more particularly to the separation of air into its constituents by pressure swing adsorption.

Conventional pressure swing adsorption processes for generating oxygen from an airstream delivered to the system commonly include a fixed bed of adsorbent material adapted to adsorb nitrogen from air routed through the bed so that an oxygen-rich product gas exits the bed. The principles of separation involved in such an adsorption system are based upon equilibrium separation. However, due to the presence of argon in air, typically 1.0 percent by volume, which is not normally adsorbed by the bed material, the percentage by volume of argon in the product stream, assuming that all of the nitrogen is adsorbed by the bed material, is about 5.0 percent. Therefore, pressure swing adsorption processes which employ the principles of equilibrium separation utilizing air as the feed stream cannot normally generate a product stream containing an oxygen concentration which is appreciably greater than 95.0 percent. Oxygen of a purity greater than 95.0 percent is preferred, however, in welding and cutting processes which require oxygen and some medically-related applications. Accordingly, it would be desirable to provide a pressure swing adsorption process capable of generating a product stream containing an oxygen concentration which is greater than 95.0 percent from an air feed stream.

One pressure swing adsorption system is known which can produce a product stream containing an oxygen concentration of relatively high purity. Such a system, shown and described in U.S. Pat. No. 4,190,424, includes a pair of beds of molecular sieve carbon and a pair of beds of zeolite molecular sieve. The beds are joined in flow communication by a relatively complicated network of conduits, valves and reservoirs, and a multiplicity of compressors. During operation of the system, a feed stream of air constituents (i.e., oxygen, nitrogen and argon) is delivered to the carbon beds where oxygen is adsorbed at a higher rate than are nitrogen and argon. The carbon beds subsequently undergo a purge step so that a purge stream which is rich in oxygen and depleted in nitrogen and argon flows out of the carbon beds. At least a portion of this purge stream is subsequently routed as feed stock through the zeolite beds where nitrogen is further adsorbed so that the product stream which exits the zeolite beds is high in oxygen purity.

A limitation associated with the system of the referenced patent relates to the relatively complicated network of conduits, valves and compressors utilized to move selected gas mixtures between and through the beds. In fact, the system includes no less than twenty valves and three pumps in order to operate in its desired manner. Due to the amount of valve componentry involved and the power requirements of the three pumps when the system is in use, the system is costly to construct and operate. It would be desirable to provide a system of the aforedescribed type which utilizes a less complicated network of conduits and valves and a fewer number of pumps, or compressors.

Another limitation associated with the system of the referenced patent relates to the means provided for removing moisture or like contaminants from the feed stream of air constituents delivered to the system. More specifically, such means call for the venting of part of the gas evacuated from the beds of the zeolite molecular sieve. Under normal operating conditions, the gas evacuated from the zeolite sieve beds contains not only the moisture but a relatively high percentage (approximately 80 percent by volume) of oxygen as well. Therefore, by venting gas evacuated from the zeolite sieve beds, the system experiences a substantial loss of oxygen. Consequently, the overall efficiency of the system to generate oxygen suffers from the venting of this stream. It would be desirable to provide a system wherein moisture contained within the feed stream of air delivered to the system is expelled therefrom with no appreciable sacrifice in the overall efficiency of the system to generate oxygen.

Accordingly, it is an object of the present invention to provide a new and improved pressure swing adsorption process and system for separating a preselected constituent from a gas mixture containing air constituents.

Another object of the present invention is to provide such a process and system which combines the principals of kinetic and equilibrium separation for the purpose of separating air into separate quantities of high purity oxygen and nitrogen.

Still another object of the present invention is to provide such a process and system for producing a product stream containing an oxygen concentration of at least 99.5 percent by volume.

A further object of the present invention is to provide such a system with an effective means of moisture removal without sacrificing the efficiency of the system to generate oxygen.

A still further object of the present invention is to provide such a system which is relatively compact and uncomplicated in construction and economical to construct and operate.

SUMMARY OF THE INVENTION

This invention resides in a pressure swing adsorption process and system utilizing a first adsorption zone adapted to principally adsorb oxygen from a feed stream containing oxygen, nitrogen and argon by kinetic separation techniques and a second adsorption zone adapted to adsorb nitrogen from a feed stream containing oxygen and nitrogen by equilibrium separation techniques. Each of the first and second adsorption zones includes an inlet and an outlet.

In an embodiment of the process, a gaseous feed stream including air constituents is directed into the inlet of the first adsorption zone so that oxygen is principally adsorbed by the first adsorption zone and a gaseous mixture rich in nitrogen and argon, when compared to the feed stream, exits the outlet of the first adsorption zone. If desired, this stream of gas exiting the first adsorption zone outlet, which normally possesses a high concentration of nitrogen by volume, may be collected for use as a high-purity nitrogen product. The feed stream flow to the inlet to the first adsorption zone is subsequently shut off, and gaseous contents of the first adsorption zone are conducted out of the first adsorption zone through the inlet thereof so that a purge stream which is rich in oxygen and depleted in nitrogen and argon, when compared to the feed stream, exits the inlet of the first adsorption zone. During an initial period of this conducting step, the purge stream is vented to the atmosphere, and during a latter period of this conducting step, the purge stream is directed into the inlet of the second adsorption zone. As the purge stream passes through the second adsorption zone, nitrogen is adsorbed so that a gaseous stream which is high in oxygen purity, when compared to the purge stream, exits the outlet of the second adsorption zone. The purge stream flow to the inlet of the second adsorption zone is subsequently shut off, and the gaseous contents of the second adsorption zone are ushered out of the second zone through the inlet thereof so that a desorption stream exits the inlet of the second adsorption zone.

In an embodiment of the system, a single pump is used for moving gaseous streams between and through the adsorption zones. First valve means are associated with the inlet of the pump and operatively connected by way of suitable conduits to the inlets of the first and second adsorption zones so that the pump inlet can selectively communicate with the inlet of the first adsorption zone or with the inlet of the second adsorption zone and the atmosphere. Second valve means are associated with the outlet of the pump and operatively connected by way of suitable conduits to the inlets of the first and second adsorption zones so that the pump outlet can selectively communicate with the atmosphere, with the inlet of the first adsorption zone or with the inlet of the second adsorption zone. In addition, control means are associated with the first and second valve means so that the system cycles through the sequential stages of the one process embodiment described above.

DETAILED DESCRIPTION OF THE ILLUSTRATED EMBODIMENTS

Figure 1:
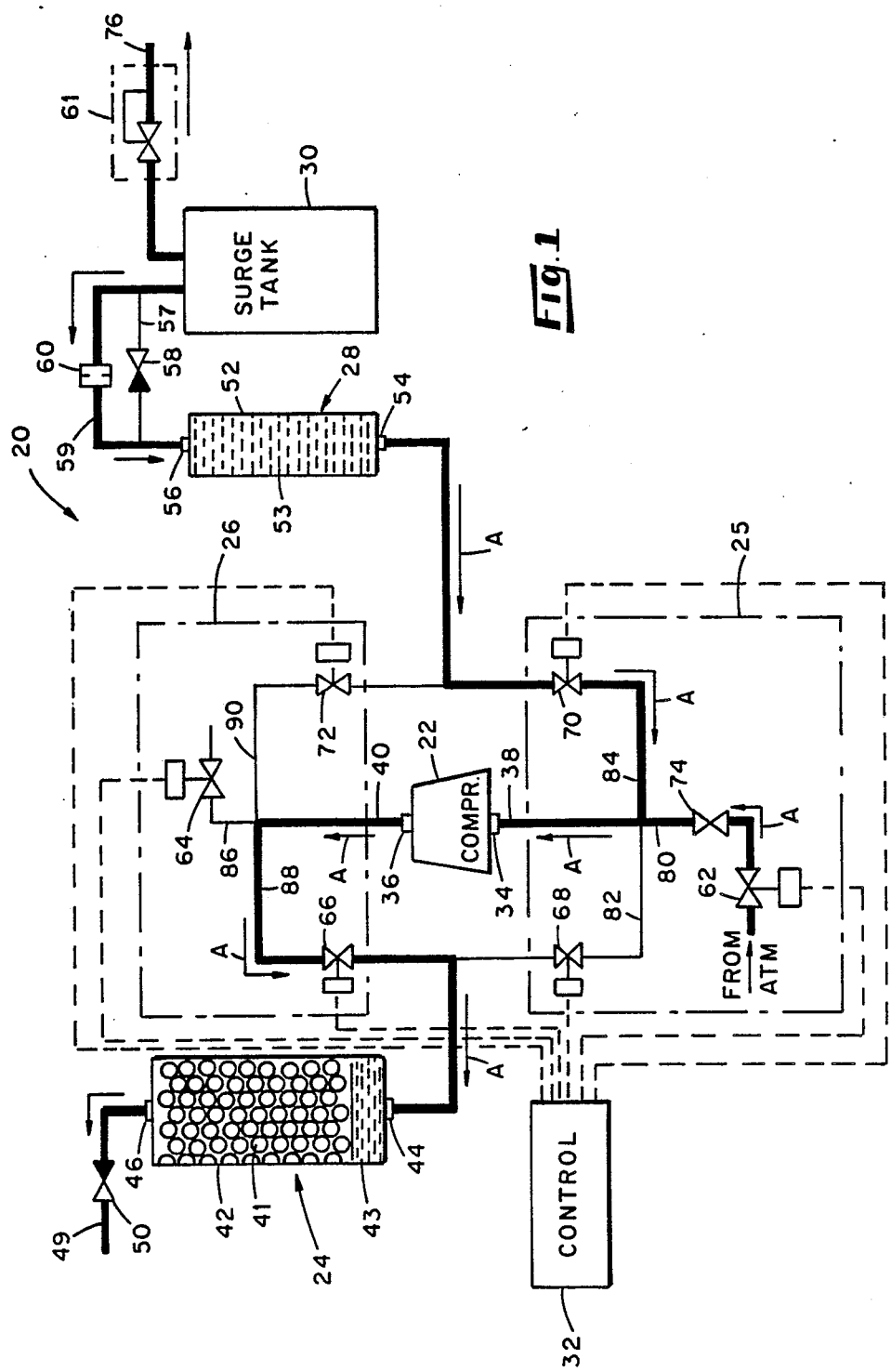
FIG. 1 is a view illustrating in diagrammatic form a system embodiment with which a pressure swing adsorption process can be carried out and illustrating the directions of gaseous flow through the system when undergoing one stage of the process cycle.
Figure 2:
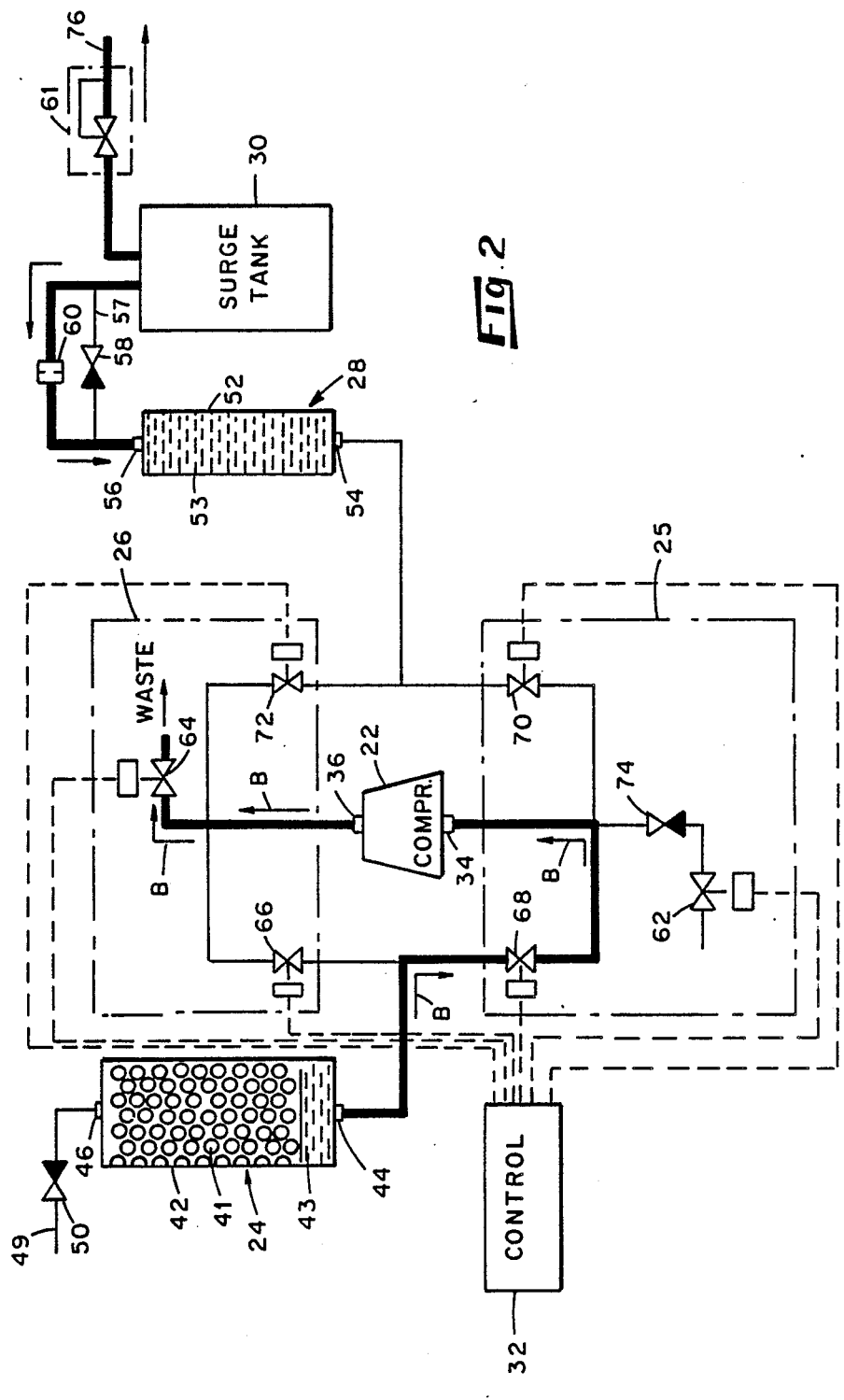
FIG. 2 is a view similar to that of FIG. 1 illustrating the directions of gaseous flow through the system when undergoing another stage of the process cycle.
Figure 3:
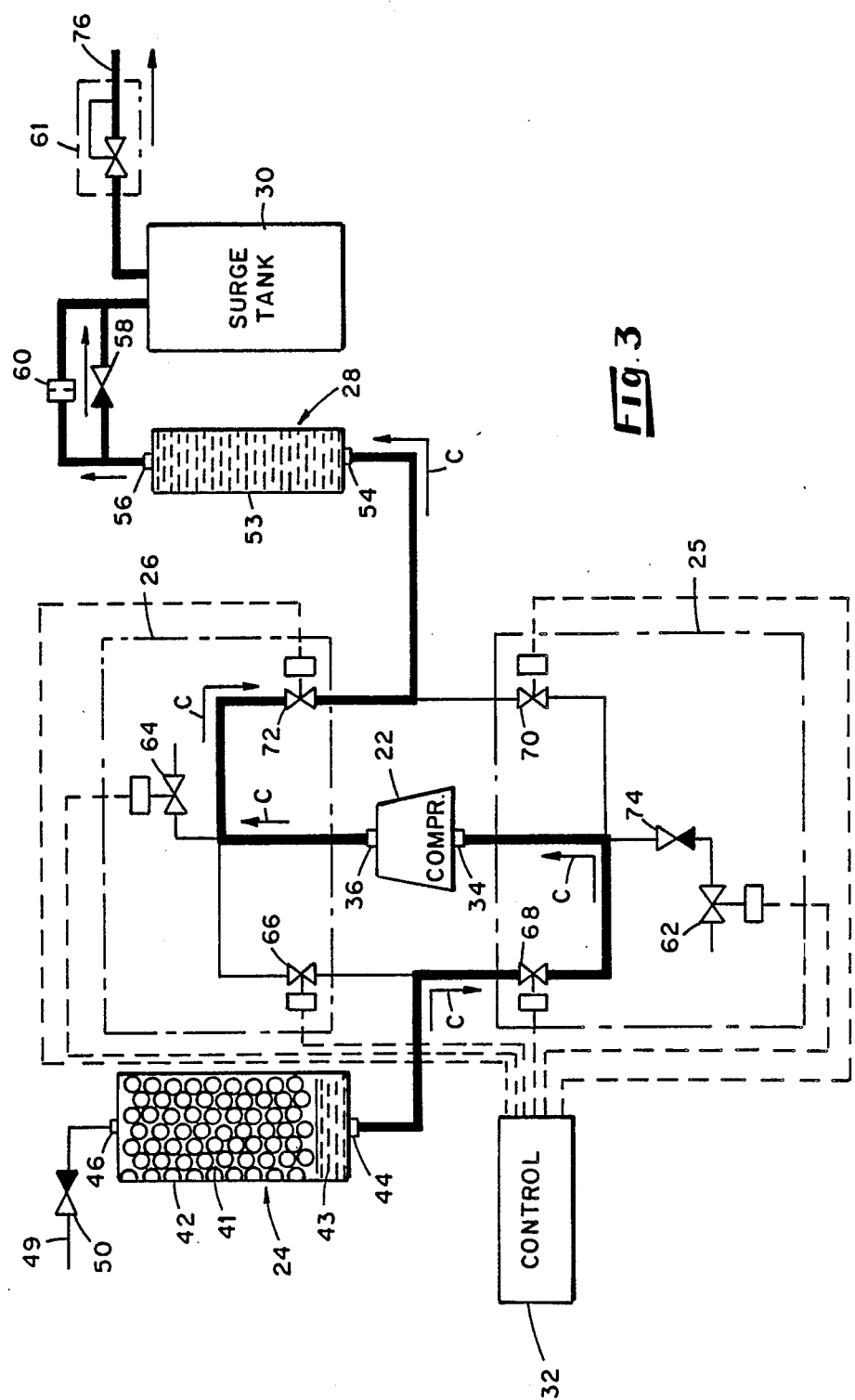
FIG. 3 is a view similar to that of FIG. 1 illustrating the directions of gaseous flow through the system when undergoing still another stage of the process cycle.
Figure 4:
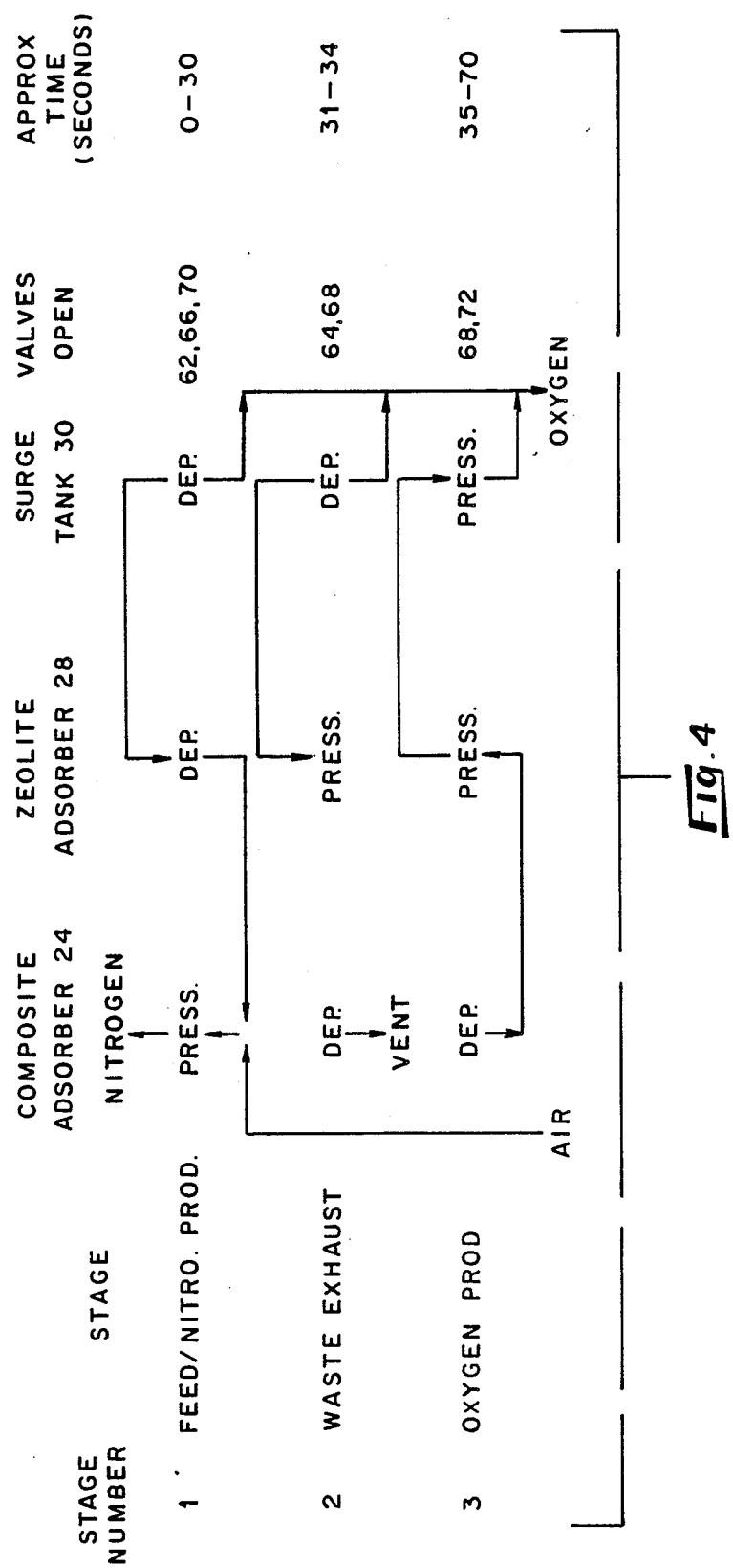
FIG. 4 is a chart depicting the various stages of operation of the embodiment of the pressure swing adsorption process diagrammatically illustrated in FIGS. 1-3.

Turning now to the drawings in greater detail, there is represented in FIG. 1 an embodiment of a system, generally indicated 20, for separating a feed stream of a gaseous mixture into streams which are rich in predetermined constituents of the mixture. In the depicted system 20, a gaseous mixture comprised, in part, of air is drawn into the system 20 and exits the system as two gaseous streams which are rich in nitrogen and oxygen, respectively. As will be apparent herein, the system 20 is specifically described and illustrated in relation to the application of pressure swing adsorption to the fractionation of air to produce a nitrogen-rich stream and an oxygen-rich stream, but it will be understood that the principles of the present invention can be variously applied.

The system 20 includes a single pump or compressor 22, a first adsorption bed or zone 24, a second adsorption bed or zone 28, a reservoir in the form of a surge tank 30 for collecting product gas exiting the second adsorption zone 28, and a network of conduits which permit operative flow communication between the compressor 22 and the first and second adsorption zones 24, 28. In addition, first and second valve means 25 and 26, respectively, are operatively positioned within the aforementioned network of conduits to enable the flow of gas through the compressor 22 to be selectively routed between the adsorption zones 24, 28. For purposes of sequencing the system 20 through its stages of operation, the system 20 also includes control means 32 operatively connected to the valve means 25 and 26.

The compressor 22 has an inlet 34 and an outlet 36, and flow conduits 38, 40 are operatively connected to the compressor inlet 34 and outlet 36, respectively. As will be apparent herein, the compressor 22 is used for drawing air into the system 20, for pumping waste gas out of the system 20 and for moving streams of gases between the first and second adsorption zones 24, 28.

The first adsorption zone 24 of the system 20 includes a single vessel 42 having an inlet 44 and an outlet 46 and having an interior cavity disposed between the inlet 44 and the outlet 46. The major portion of the cavity of the vessel 42 is filled with a quantity of adsorbent material 41 adapted to adsorb oxygen from a feed stream containing oxygen, nitrogen and argon at a faster rate than the nitrogen and argon is adsorbed. Accordingly, the adsorbent material 41 of the zone 24 is adapted to adsorb constituents of a gaseous mixture based upon principles of kinetic separation wherein the principal constituent adsorbed from a gaseous mixture containing oxygen, nitrogen and argon is oxygen. The adsorption material 41 of the first adsorption zone 24 may be comprised of any of a number of adsorbent materials but is preferably a carbon sieve material.

In addition to the carbon sieve material 41, the vessel 42 also contains a layer of a relatively small quantity 43, when compared to the amount of carbon sieve material 41, of zeolite sieve material disposed between the inlet 44 and the carbon sieve material 41. Together, the carbon sieve material 41 and zeolite sieve material 43 provide the first zone 24 with a composite nature. The zeolite sieve material 43 is included within the zone 24 for its capacity to adsorb moisture and like contaminants and is disposed within the zone 24 so that a gaseous mixture which enters the inlet 44 of the zone 24 is forced to pass through the zeolite sieve material 43 before entering the carbon sieve material 41. Therefore, upon entering the carbon sieve material 41 through the zone inlet 44, the gaseous mixture is substantially free of moisture and like contaminants.

During one phase of operation of the system 20, a gaseous mixture containing oxygen, nitrogen and argon is routed into the inlet 44 of the first zone 24. Because the diffusion rate of oxygen within the first zone 24 is about two orders of magnitude higher than the diffusion rate of nitrogen or argon, nitrogen and argon pass through the carbon sieve material 41 and out of the zone outlet 46 while oxygen and smaller amounts of nitrogen and argon are adsorbed by the carbon sieve material 41. Since the gaseous stream which exits the zone outlet 46 is relatively rich in nitrogen, by volume, this exiting gaseous stream may be collected in a surge tank (not shown) for use as a product gas which is high in nitrogen purity. In order to prevent the gaseous mixture which exits the zone outlet 46 from flowing back into the zone 24 by way of the outlet 46, there is provided a check valve 50 operatively mounted in a conduit 49 leading from the zone outlet 46.

The second adsorption zone 28 of the system 20 includes a single vessel 52 having an inlet 54 and an outlet 56 and an interior cavity disposed between the inlet 54 and the outlet 56. The cavity of the vessel 52 is filled with a quantity of adsorption material 53 adapted to adsorb nitrogen from a gaseous stream containing oxygen, nitrogen and argon and wherein the adsorption mechanism of the zone 28 is based upon principles of equilibrium separation. The adsorption material 53 of the second adsorption zone 28 may be comprised of any of a number of materials but is preferably a zeolite sieve material. For purposes of generating nitrogen-rich and oxygen-rich streams with the pressure swing adsorption process described herein, the quantity of zeolite sieve material 53 contained within the vessel 52 of the second zone 28 is relatively small in comparison to the quantity of carbon sieve material 41 positioned within the vessel 42 of the first zone 24. In the depicted system, the quantity of zeolite sieve material 53 is about one-third as large as the quantity of carbon sieve material 41.

During a preselected phase of operation of the system 20, a gaseous stream which is rich in oxygen and depleted in nitrogen and argon, when compared to the feed stream entering the first zone 24, is conducted into the inlet 54 of the second zone 28 so that nitrogen is adsorbed by the adsorption material 53. Consequently, the gaseous stream which flows out of the zone 28 through the zone outlet 56 is high in oxygen concentration, low in argon and further depleted of nitrogen. For collection of the high-purity oxygen product which flows out of the second zone 52 through the zone outlet 56, the surge tank 30 is connected to the zone outlet 56 by way of parallel conduits 57, 59. A check valve 58 is suitably positioned within the conduit 57 for restricting gases which move therethrough to movement toward the surge tank 30. In addition, an orifice 60 is suitably positioned within the conduit 59 for controlling the flow rate of product gas collected within the surge tank 30 back to the zone outlet 56. To facilitate the withdrawal of product gas from the surge tank 30 at a regulated pressure, an oxygen regulator 61 is mounted in a conduit 76 leading from the surge tank outlet.

As mentioned earlier, the first and second valve means 25 and 26, respectively, of the system 20 are positioned within the network of conduits interconnecting the compressor 22 and the adsorption zones 24 and 28 to enable the flow of gaseous streams to be selectively routed between and through the zones 24 and 28. For present purposes, conduits of the aforementioned network are indicated 80, 82, 84, 86, 88 and 90 in FIG. 1. The first valving means 25 includes a first two-way valve 62 operatively connected upstream of the compressor inlet 34 and in-line with the conduit 80 as shown in FIG. 1 to selectively permit or prevent the compressor 22 from drawing air into the system 20 from the surrounding atmosphere. The first valving means 25 also includes a second two-way valve 68 mounted in conduit 82 and connected in series between the compressor inlet 34 and the inlet 44 of the first zone 24 and a third two-way valve 70 mounted in conduit 84 and connected in series between the compressor inlet 34 and the inlet 54 of the second zone 28. For a reason apparent herein, the valve means 25 further includes a check valve 74 connected in series with the first valve 62 and the compressor inlet 34 for restricting the flow of air through the valve 62 to movement toward the compressor inlet 34.

The valve means 26 includes a first two-way valve 64 operatively connected downstream of the compressor outlet 36 and in-line with the conduit 86 as shown in FIG. 1 to selectively permit or prevent the compressor 22 from discharging gas from the system 20 into the surrounding atmosphere. The second valve means 26 also includes a second two-way valve 66 mounted in conduit 88 and connected in series between the compressor outlet 36 and the inlet 44 of the first zone 24 and a third two-way valve 72 mounted in conduit 90 and connected in series between the compressor outlet 36 and the inlet 54 of the second zone 28.

Each of the aforedescribed two-way valves 62, 64, 66, 68, 70 and 72 in the system 20 is a solenoid-type of valve responsive to a turning on or shutting off of power to the valve. In addition, the control means 32 of the system 20 includes timing mechanisms appropriately wired to the valves 62, 64, 66, 68, 70 and 72 for selectively opening or closing the valves at the end of a predetermined period of time. Therefore, the various stages of the system operation, described herein, are automatically controlled by the control means 32 which automatically control the amount of time that each of the valves 62, 64, 66, 68, 70 or 72 is opened and closed.

With reference to FIGS. 1–4, an embodiment of a pressure swing adsorption process performed by the system 20 includes operating cycles wherein each cycle is comprised of three stages. Briefly, the first stage can be described as a feed/nitrogen production stage during which a feed stream including air drawn from the atmosphere and a gaseous desorption stream which exits the inlet 54 of the second zone 28 is directed into the inlet 44 of the first zone 24. As the feed stream passes through the first zone 24, a gas which is rich in nitrogen and argon, when compared to the feed stream entering the zone inlet 44, exits the zone outlet 46. If desired, the gas exiting the zone outlet 46 can be collected for use as a high-purity nitrogen product. The second stage can be described as a waste exhaust stage during which zone inlet 44 is vented to the atmosphere. The third stage can be described as an oxygen production stage during which gaseous contents of the first adsorption zone 24 are conducted into the second zone 28 through the inlet 54. As the gaseous contents conducted from the first zone 24 are moved through the second zone 28, a product gas which is rich in oxygen, when compared to the flow of gaseous contents entering the zone inlet 54, exits the zone outlet 56 and is collected for use in surge tank 30. Upon completion of the oxygen production stage, the second zone 28 is purged of gaseous contents so that a desorption stream exits the second zone 28 through the inlet 54 thereof and is ushered, with a quantity of atmospheric air, toward the inlet 44 of the first zone 24 to begin the process cycle again.

Figure 5:
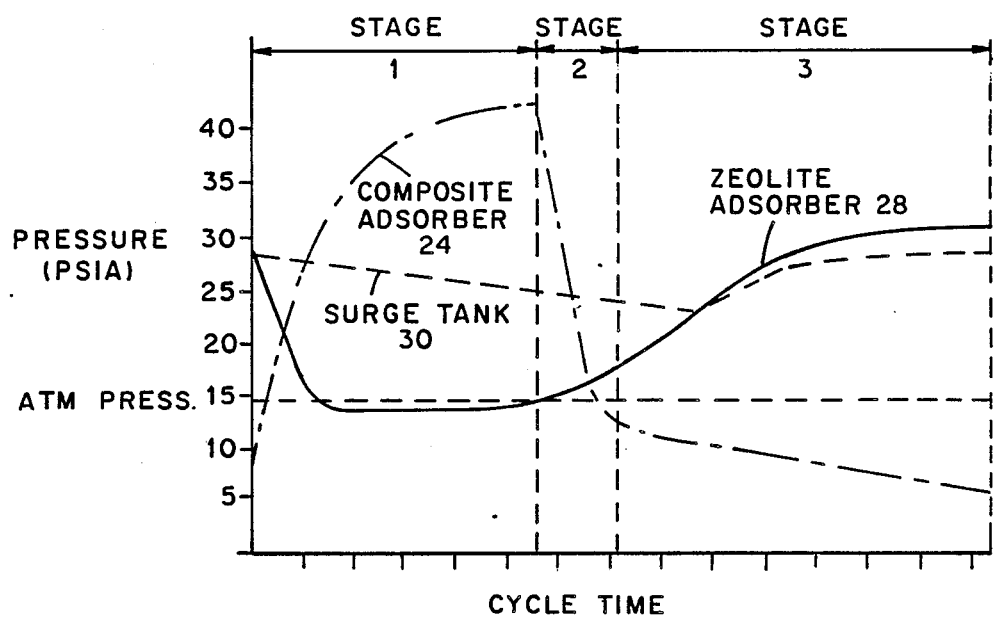
FIG. 5 is a graph illustrating the pressure levels of the system adsorbers and surge tank during the stages of the operation depicted in FIG. 4.

Operation of the aforedescribed process embodiment can be best understood through a description of the sequencing of the two-way valves 62, 64, 66, 68, 70 and 72 of the system 20. Before the first, or feed/nitrogen production, stage is initiated, valves 68 and 72 are open and valves 62, 64, 66 and 70 are closed so that a stream of gas is pumped by the compressor 22 from the first zone 24 to the second zone 28 and so that the internal pressure of the first zone 24 is below atmospheric pressure and the internal pressure of the second zone 28 is pressurized to an elevated level, as indicated in FIG. 5.

To initiate the first, or feed/nitrogen production stage, valves 64, 68 and 72 are closed and valves 62, 66 and 70 are opened so that a feed stream mixture of atmospheric air and a desorption gas stream from the pressurized second zone 28 is delivered to the inlet 44 of the first zone 24 by the compressor 22 as indicated by the flow direction arrows A in FIG. 1. With reference to FIG. 5, the internal pressure of the second zone 28 falls rapidly during the initial moments of the first stage to a level slightly below atmospheric pressure. Until the pressure of the second zone 28 falls to atmospheric level, of course, the feed stream delivered to the inlet 44 of the first zone 24 is comprised entirely of the desorption gas stream exiting the second zone inlet 54. The check valve 74 prevents this desorption gas from exiting the system 20 through the open valve 62. Once the internal pressure of the second zone 28 reaches atmospheric, the compressor 22 begins to pull air from the surrounding atmosphere and continues its evacuation of the second zone 28. Therefore, during the latter moments of the first stage, the gaseous mixture pulled through the compressor 22 for delivery as feed stream to the first zone 24 is comprised partially of the gaseous contents drawn from the second zone 28 and partially of atmospheric make-up air drawn from the surroundings.

The gaseous mixture which is moved through the compressor 22 during the first, or nitrogen-production, stage, is delivered as a feed stream to the first zone 24 where oxygen is principally adsorbed by the adsorption material 41. As mentioned earlier, moisture or like contaminants contained within the feed stream are adsorbed in the bed layer of zeolite sieve material 43 so that upon entering the layer of carbon sieve material 41, the feed stream is substantially free of moisture and like contaminants. As the feed stream continues to be moved through the bed material 41, oxygen is principally adsorbed so that the gaseous stream which exits the zone outlet 46 is rich in nitrogen and argon, when compared to the feed stream. As indicated in FIG. 5, the internal pressure of the first zone 24 increases throughout the duration of the first, or feed/nitrogen production, stage.

The second, or waste exhaust, stage is initiated when the first zone 24 becomes about saturated and, accordingly, the timing controls of the system control means 32 are preset to simultaneously close and open the appropriate valves following a predetermined period of time normally required to saturate the first adsorption zone 24 during the first, or feed/nitrogen production, stage. More specifically, following the predetermined period of time required to saturate the zone 24, the control means 32 closes valves 62, 66, 70 and 72 (closed from the previous first stage) and opens valves 64 and 68 to initiate the second stage. With the valves 64 and 68 open, the gaseous contents of the adsorber zone inlet 44 are vented to the atmosphere as indicated by the flow direction arrows B in FIG. 2. The check valve 50 positioned at the first adsorber zone outlet 46 prevents the flow of gas which exits the zone outlet 46 from flowing back into the outlet 46 of the adsorber zone 24.

As the gaseous contents exit the first adsorption zone 24 through the inlet 44 thereof, the first zone 24 is purged of desorbed constituent in a purge gas stream. It follows that since oxygen is the principal gaseous constituent adsorbed by the zone 24 during the first stage, the purge gas stream exiting the zone inlet 44 is rich in oxygen in comparison to the feed stream entering the zone inlet 44.

The purpose of the second, or waste exhaust, stage is to discharge to the atmosphere as waste the portion of the purge gas stream which contains the highest concentration of moisture and similar contaminants purged from the first zone 24. More specifically, the initial portion of the purge gas flow exiting the adsorber zone inlet 44 contains the major portion of the moisture and like contaminants previously collected by the zeolite layer 43, and it is this moisture-containing portion of the purge gas stream which is vented to the atmosphere as waste. The portion of the purge gas stream which follows the moisture-containing portion progressively increases in oxygen concentration with respect to time. As depicted in FIG. 5, the internal pressure of the first adsorption zone 24 drops rapidly during the period of the second, or waste exhaust, stage and is reduced to a level below atmospheric as a result of the continued pull of the compressor 22 upon the gaseous contents of the first zone 24.

Following a predetermined period of time from which the waste exhaust stage is initiated such as, for example, between 2.0 and 5.0 seconds, the control means 32 closes the valve 64 to shut off the flow of purge gas to the atmosphere and opens the valve 72 to begin the third, or oxygen production stage. With the valves 68 and 72 now open, the gaseous contents of the first zone 24 which are continued to be evacuated from the inlet 44 of the first adsorption zone 24 by the compressor 22 are pumped into the inlet 54 of the second adsorption zone 28 as indicated by the flow direction arrows C in FIG. 3. As these gaseous contents, which are rich in oxygen and depleted in nitrogen and argon when compared to the feed stream entering the first zone 24, continue to be conducted from the first zone 24 through the adsorption zone inlet 54, nitrogen is adsorbed from the stream of gas moving through the second zone 28 so that the gas which exits the adsorption zone outlet 56 and collected within the surge tank 30 as a product gas is comprised substantially of high-purity oxygen.

As depicted in FIG. 5, the internal pressure of the first adsorption zone 24 continues to fall throughout the duration of the third, or oxygen production, stage while the internal pressure of the second adsorber zone 28 increases. The compressor 22 acts as a vacuum pump during the course of the third stage by maintaining the internal pressure of the first zone 24 below atmospheric while simultaneously increasing the internal pressure level of the second zone 28 to an elevated level. Thus, the pressure level of the second zone 28 is in an elevated condition and the pressure level of the first zone 24 is in a depressurized condition below the level of atmospheric when restarting the operation cycle with the first, or feed/nitrogen production, stage.

To restart the operation cycle with the first, or feed/nitrogen production stage, the control means 32 closes valves 68 and 72 and re-opens valves 62, 70 and 66. This first, or feed/nitrogen production, stage is restarted when the adsorber zone 28 becomes about saturated. Accordingly, the timing controls of the system control means 32 are preset to simultaneously close the valves 68 and 72 and re-open valves 62, 70 and 66 following a period of time normally required to saturate the adsorber zone 28 during the third, or oxygen production, stage.

As mentioned earlier, the feed stream delivered to the inlet 44 of the first adsorber zone 24 is comprised in part of the desorption gas stream which exits the inlet 54 of the second zone 28 during the first, or feed/nitrogen production, stage. Because the gaseous stream conducted to the second zone 28 during the third, or oxygen production, stage is highly enriched in oxygen, the desorption gas stream which is evacuated from the second zone 28 during the first stage still contains oxygen in higher concentrations than in air. Therefore, by recycling the desorption gas stream exiting the second zone 28 through the first zone 24 during the first stage increases the efficiency of the high purity oxygen generation substantially. Oxygen production is further enhanced by the purge loop provided by the conduit 59 and orifice 60.

With regard to the decrease in internal pressure of the surge tank 30 during the first and second stages, as depicted in FIG. 5, it will be understood that a high-purity oxygen product may be continually withdrawn from the surge tank 30 through the conduit 76 (FIG. 1) for use during any and all stages of system operation. Accordingly, the internal pressure of the surge tank 30 plotted in the graph of FIG. 5 reflects a continued withdrawal of product gas from the surge tank 30 and increases only during the third stage when the tank 30 is repressurized with product gas exiting the outlet 56 of the second zone 28.

The aforedescribed system 20 can be optimized and operated to simultaneously generate limited quantities of high purity (99.5% pure) oxygen and nitrogen. Alternatively, the system 20 can be optimized and operated to simultaneously generate larger quantities of one of the oxygen or nitrogen components at high purity (99.5% pure) and the other of the nitrogen or oxygen components at lower purity (up to about 90.0% pure). The optimization of either of the aforementioned operations can be achieved by appropriately adjusting cycle times and the relative amounts of products withdrawn through the conduit 49 associated with the zone outlet 46 and conduit 76 associated with the outlet of the surge tank 30.

It follows from the foregoing that the aforedescribed invention accomplishes its intended objects and objectives. More specifically, a two-bed pressure swing adsorption process has been described which utilizes both kinetic separation and equilibrium separation mechanisms for simultaneously producing nitrogen-rich and oxygen-rich product streams which possess a purity of at least 99.5%. One of the adsorption beds is comprised of a layered composition of two adsorption materials. Venting this composite bed to the atmosphere during a preselected stage of the operating cycle removes moisture from and thereby prevents a net build-up of moisture within the system. In addition, the system 20 includes a single compressor 22 and a small number of valves thus rendering the system 20 economical to operate and uncomplicated in construction. During operation of the system 20, the single compressor 22 regenerates one adsorption zone through evacuation while simultaneously pressurizing and feeding the other adsorption zone to effect separation.

It will be understood that numerous modifications and substitutions can be had to the aforedescribed embodiments without departing from the scope of the invention. For example, although the valving means 25 and 26 have each been shown and described as including three two-way valves, valving means in accordance with the broader aspects of the system of the invention may include a fewer number of valves appropriately constructed for routing the various gas flows along the desired flow paths. Accordingly, the aforedescribed embodiments are intended for the purpose of illustration and not as limitation.

What is claimed is:

1. A pressure swing adsorption process utilizing first and second adsorption zones, each zone including an inlet and an outlet and wherein the first adsorption zone is adapted to principally adsorb oxygen from a feed stream containing oxygen, nitrogen, argon and moisture and like contaminants by kinetic separation techniques and the second adsorption zone is adapted to adsorb nitrogen from a feed stream containing oxygen and nitrogen by equilibrium separation techniques, said process comprising the steps of:
    (a) directing a gaseous feed stream into the inlet of the first adsorption zone wherein the feed stream is draw, at least in part, from the atmosphere and includes oxygen, nitrogen, argon and moisture and like contaminants so that oxygen is principally adsorbed by the first adsorption zone as well as moisture and like contaminants contained within the feed stream and a gaseous mixture rich in nitrogen and argon, when compared to the feed stream, exits the outlet of the first adsorption zone;
    (b) shutting off the feed stream flow to the inlet of the first adsorption zone;
    (c) conducting gaseous contents from the first adsorption zone through the inlet thereof for a predetermined period of time so that a purge stream which is rich in oxygen and depleted in nitrogen and argon, when compared to the feed stream, exits the inlet of the first adsorption zone and so that the oxygen concentration of the purge stream generally increases throughout the predetermined period, said predetermined period of time comprised of an initial period of time beginning at the start of the predetermined period of time and a remaining period of time beginning at the end of said initial period and ending with the end of the predetermined period;
        (1) venting the purge stream conducted from the first adsorption zone to the atmosphere throughout said initial period of time to expel the moisture and like contaminants adsorbed by the first adsorption zone from the process cycle;
        (2) directing the purge stream conducted from the first adsorption zone into the inlet of the second adsorption zone throughout said remaining period of time so that throughout the remaining period, nitrogen is adsorbed from the purge stream by the second adsorption zone and so that a gaseous stream which is high in oxygen purity, when compared to the purge stream, exits the outlet of the second adsorption zone;
    (d) shutting off the purge stream flow to the inlet of the second adsorption zone; and
    (e) ushering gaseous contents from the second adsorption zone through the inlet thereof so that a desorption stream exits the inlet of the second adsorption zone.

2. The process as defined in claim 1 wherein step (a) includes a step of delivering the desorption stream which exits the inlet of the second adsorption zone to the inlet of the first adsorption zone so that the desorption stream comprises part of the feed stream directed to the first adsorption zone.

3. The process as defined in claim 1 wherein step (e) is followed by a repeat of steps (a) through (e).

4. The process is defined in claim 3 wherein step (a) is followed by a step of collecting the gaseous mixture exiting the outlet of the first adsorption zone as a product gas which is rich in nitrogen.

5. The process as defined in claim 3 wherein step (c) is followed by a step of collecting the gaseous stream exiting the outlet of the second adsorption zone as a product gas which is rich in oxygen.

6. The process as defined in claim 1 wherein the movement of gas in steps (a), (c) and (e) is effected by a single pump.

7. A pressure swing adsorption system comprising:
a first adsorption zone having an inlet and an outlet and adapted to principally adsorb oxygen from a feed stream containing oxygen, nitrogen, argon and moisture and like contaminants by kinetic separation techniques;
a second adsorption zone having an inlet and an outlet and adapted to adsorb nitrogen from a gaseous stream containing oxygen and nitrogen by equilibrium separation techniques;
a single pump having an inlet and an outlet for moving gaseous streams between and through the adsorption zones;
conduit means including a first conduit joining the inlet of the pump in flow communication with the surrounding atmosphere, a second conduit joining the inlet of the pump in flow communication with the inlet of the first adsorption zone, a third conduit joining the inlet of the pump in flow communication with the inlet of the second adsorption zone, a fourth conduit joining the outlet of the pump in flow communication with the surrounding atmosphere, a fifth conduit joining the outlet of the pump in flow communication with the inlet of the first adsorption zone, and a sixth conduit joining the outlet of the pump in flow communication with the inlet of the second adsorption zone;
first valve means associated with the first, second and third conduits for permitting the pump inlet to selectively communicate with the inlet of the first adsorption zone or with the inlet of the second adsorption zone and the atmosphere, the first valve means including a check valve connected in series with the pump inlet and the first conduit for restricting the flow of air through the first conduit to movement from the atmosphere toward the pump inlet;
second valve means associated with the fourth, fifth and sixth conduits for permitting the pump outlet to selectively communicate with the atmosphere, with the inlet of the first adsorption zone or with the inlet of the second adsorption zone;
control means associated with the first and second valve means so that when the pump is in operation, the system cycles through the sequential stages of:
(a) directing a gaseous feed stream into the inlet of the first adsorption zone wherein the feed stream is drawn, at least in part, from the atmosphere and includes oxygen, nitrogen, argon and moisture and like contaminants and so that oxygen is principally adsorbed by the first adsorption zone as well as moisture and like contaminants contained within the feed stream and a gaseous mixture rich in nitrogen and argon, when compared to the feed stream, exits the outlet of the first adsorption zone;
(b) shutting off the feed stream flow to the inlet of the first adsorption zone;
(c) conducting gaseous contents from the first adsorption zone through the inlet thereof for a predetermined period of time so that a purge stream which is rich in oxygen and depleted in nitrogen and argon, when compared to the feed stream, exits the inlet of the first adsorption zone and so that the oxygen concentration of the purge stream generally increases throughout the predetermined period, said predetermined period of time comprised of an initial period of time beginning at the start of the predetermined period of time and a remaining period of time beginning at the end of said initial period and ending with the end of the predetermined period;
(1) venting the purge stream conducted from the first adsorption zone through the pump and to the atmosphere throughout said initial period of time to expel the moisture and like contaminants adsorbed by the first adsorption zone from the process cycle;
(2) directing the purge stream conducted from the first adsorption zone through the pump and into the inlet of the second adsorption zone throughout said remaining period of time so that throughout the remaining period, nitrogen is adsorbed from the purge stream by the second adsorption zone and so that a gaseous stream which is high in oxygen purity, when compared to the purge stream, exits the outlet of the second adsorption zone;
(d) shutting off the purge stream flow to the inlet of the second adsorption zone; and
(e) ushering gaseous contents from the second adsorption zone through the inlet thereof so that a desorption stream exits the inlet of the second adsorption zone, and wherein step (a) includes a step of delivering the desorption stream which exits the inlet of the second adsorption zone through the pump to the inlet of the first adsorption zone so that the desorption stream comprises part of the feed stream directed to the first adsorption zone.

8. The system of claim 7 wherein the first adsorption zone includes a bed comprised of a relatively large quantity of carbon sieve material and a relatively small quantity of zeolite sieve material disposed between the inlet of the first adsorption zone and the quantity of carbon sieve material for adsorbing moisture and like contaminants contained within the feed stream which enters the first adsorption zone.

9. The system of claim 7 wherein the first adsorption zone includes a quantity of carbon sieve material, the second adsorption zone includes a quantity of zeolite sieve material and the quantity of zeolite sieve material contained within the second adsorption zone is relatively small in comparison to the quantity of carbon sieve material contained within the first adsorption zone.

10. The system of claim 7 further comprising a check valve associated with the outlet of the first adsorption zone for preventing a back flow of gas into the first adsorption zone through the outlet thereof.

* * * * *